US011459018B2

(12) United States Patent
Maida et al.

(10) Patent No.: US 11,459,018 B2
(45) Date of Patent: Oct. 4, 2022

(54) TELESCOPE DRIVE BRACKET WITH ANTI-ROTATION FEATURES

(71) Applicant: Steering Solutions IP Holding Corporation, Saginaw, MI (US)

(72) Inventors: Robert D. Maida, Pinconning, MI (US); Timothy D. Beach, Saginaw, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 193 days.

(21) Appl. No.: 17/034,561

(22) Filed: Sep. 28, 2020

(65) Prior Publication Data

US 2022/0097750 A1    Mar. 31, 2022

(51) Int. Cl.
| | |
|---|---|
| *B62D 1/18* | (2006.01) |
| *B62D 1/185* | (2006.01) |
| *F16M 13/02* | (2006.01) |
| *F16H 25/20* | (2006.01) |
| *B62D 1/181* | (2006.01) |

(52) U.S. Cl.
CPC ............ *B62D 1/185* (2013.01); *F16H 25/20* (2013.01); *F16M 13/02* (2013.01); *B62D 1/181* (2013.01); *F16H 2025/2037* (2013.01); *F16H 2025/2084* (2013.01)

(58) Field of Classification Search
CPC . B62D 1/185; B62D 1/181; F16H 2025/2084; F16H 2025/2037; F16M 13/02
See application file for complete search history.

(56) References Cited

U.S. PATENT DOCUMENTS

| 4,967,618 A * | 11/1990 | Matsumoto | B62D 1/181 |
| | | | 280/775 |
| 5,911,789 A * | 6/1999 | Keipert | F16H 25/2006 |
| | | | 280/775 |
| 6,390,505 B1 * | 5/2002 | Wilson | B62D 1/181 |
| | | | 280/775 |
| 10,228,047 B2 * | 3/2019 | Nunez | F16H 25/20 |
| 2021/0129894 A1 * | 5/2021 | Ryne | B60K 37/06 |
| 2021/0339792 A1 * | 11/2021 | Kwon | B62D 1/185 |
| 2021/0380157 A1 * | 12/2021 | Huber | F16C 43/02 |
| 2022/0097750 A1 * | 3/2022 | Maida | B62D 1/185 |

FOREIGN PATENT DOCUMENTS

| WO | WO-2017139627 A1 * | 8/2017 | ............ B62D 1/181 |
| WO | WO-2020104608 A1 * | 5/2020 | ............ B62D 1/181 |

* cited by examiner

*Primary Examiner* — David M Fenstermacher
(74) *Attorney, Agent, or Firm* — Dickinson Wright PLLC

(57) ABSTRACT

A steering column assembly includes a lower jacket. The assembly also includes an upper jacket in telescoping engagement with the lower jacket. The assembly further includes a telescope actuator assembly comprising a nut translatable along a lead screw. The assembly yet further includes a telescope drive bracket having a base portion and a pair of arms extending from the base portion, the pair of arms each defining a slot with a respective slot surface, wherein the nut is disposed within the slots in an assembled condition to move the upper jacket in a telescope direction relative to the lower jacket. The assembly also includes a first pair of anti-rotation features disposed on the slot surface of a first arm of the pair of arms.

15 Claims, 4 Drawing Sheets

US 11,459,018 B2

TELESCOPE DRIVE BRACKET WITH ANTI-ROTATION FEATURES

FIELD OF THE INVENTION

The embodiments described herein relate to vehicle steering systems and, more particularly, to a telescope drive bracket with anti-rotation features.

BACKGROUND

A steering column assembly of a vehicle may be adjustable in a rake (tilt) direction and/or in a telescoping direction. Each of these adjustments may be carried out with respective power assemblies or mechanisms. Typical telescope drive systems may include a telescope drive bracket mounted to a column jacket. The telescope drive system is mounted rigidly at one location, while another location moves in a linear direction, thus driving the component it is fixed to, resulting in a desired telescope travel.

Typical stamped telescope drive brackets are closed ended and have an accompanied nut capture bracket and two screws to maintain a jackscrew in a radial position during an energy absorption event. In some designs, the telescope actuator assembly must be assembled perpendicular to the centerline of the mating hole of the telescoped drive bracket, which limits packaging options.

SUMMARY

According to one aspect of the disclosure, a steering column assembly includes a lower jacket. The assembly also includes an upper jacket in telescoping engagement with the lower jacket. The assembly further includes a telescope actuator assembly comprising a nut translatable along a lead screw. The assembly yet further includes a telescope drive bracket having a base portion and a pair of arms extending from the base portion, the pair of arms each defining a slot with a respective slot surface, wherein the nut is disposed within the slots in an assembled condition to move the upper jacket in a telescope direction relative to the lower jacket. The assembly also includes a first pair of anti-rotation features disposed on the slot surface of a first arm of the pair of arms.

According to another aspect of the disclosure, a telescope drive bracket for a steering column assembly includes a base portion. The telescope drive bracket also includes a pair of arms extending from the base portion, the pair of arms each defining a slot with a respective slot surface. The telescope drive bracket further includes a first pair of anti-rotation features disposed on the slot surface of a first arm of the pair of arms. The telescope drive bracket yet further includes a second pair of anti-rotation features disposed on the slot surface of a second arm of the pair of arms, wherein each of the first pair and the second pair of anti-rotation features comprises a protrusion extending radially inwardly into the slot away from the slot surface.

According to yet another aspect of the disclosure, a method of assembling a steering column is provided. The method includes inserting a nut of a telescope actuator assembly into a slot defined by slot surfaces of a pair of arms of a telescope drive bracket at a first angle. The method also includes rotating the nut within the slot to be disposed in contact with a pair of anti-rotation features formed on each of the slot surfaces to a second angle that is an operating position for the nut, wherein contact with the pair of anti-rotation features constrains rotation of the nut within the slot relative to the telescope drive bracket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated are embodiments of a telescope drive bracket that prevents rotation of a nut located therein during an energy absorption event, while still facilitating efficient assembly of a telescope actuator assembly to the telescope drive bracket.

Figure 1:
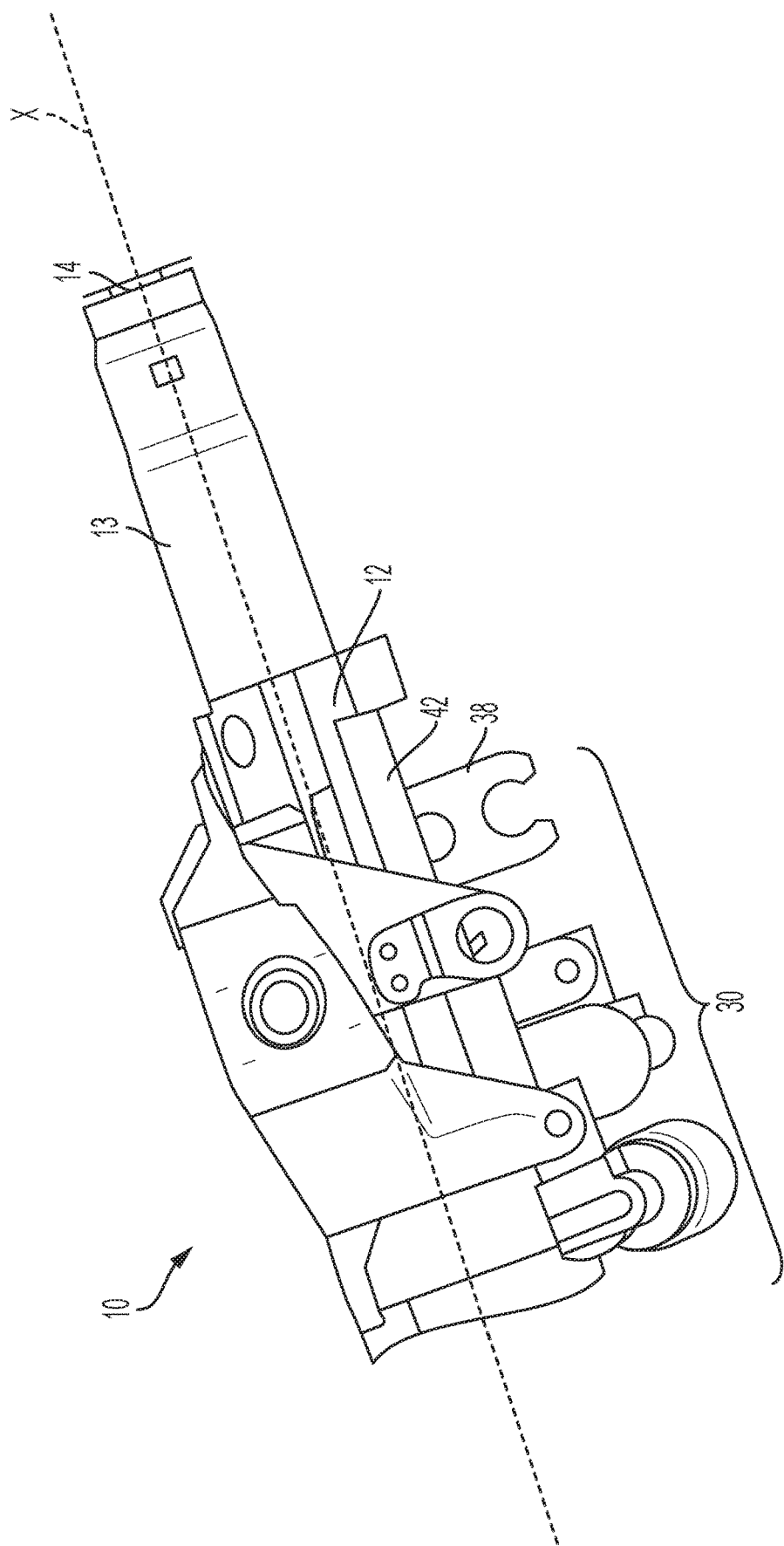
FIG. 1 is a side view of a steering column assembly.

FIG. 1 illustrates a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X), and may be adjustable in a rake/tilt direction in some embodiments. The steering column assembly 10 includes a lower jacket 12, an upper jacket 13, and a steering shaft 14 extending along the longitudinal axis X. The steering shaft 14 and the upper jacket 13 are operatively coupled to each other and disposed in telescoping engagement with the lower jacket 12. In other words, the steering shaft 14 has a portion disposed within the upper jacket 13 and a portion disposed within the lower jacket 12. The upper jacket 13 has a portion extending into the lower jacket 12 and is translatable therein.

A telescope actuator assembly 30 (see also FIG. 7) is provided to facilitate powered telescope adjustments of the upper jacket 13 and the steering shaft 14. The telescope actuator assembly 30 includes a leadscrew 32 having a nut 34 threaded thereto. A motor 36 rotatably drives the leadscrew 32 to translate the nut 34 therealong. The nut 34 is operatively coupled to the upper jacket 13 with a telescope drive bracket 38, such that linear movement of the nut 34 along the leadscrew 32 drives the upper jacket 13 to and from different telescope positions.

Figure 3:
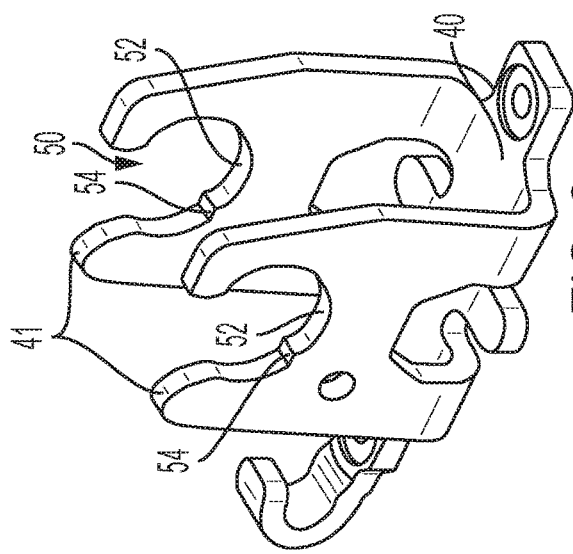
FIG. 3 is a first perspective view of the telescope drive bracket.
Figure 4:
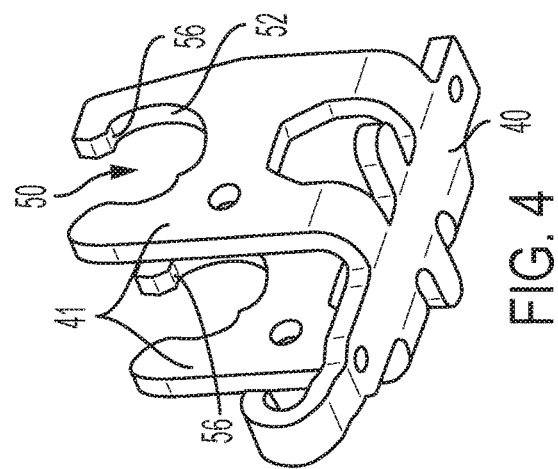
FIG. 4 is a second perspective view of the telescope drive bracket.
Figure 2:
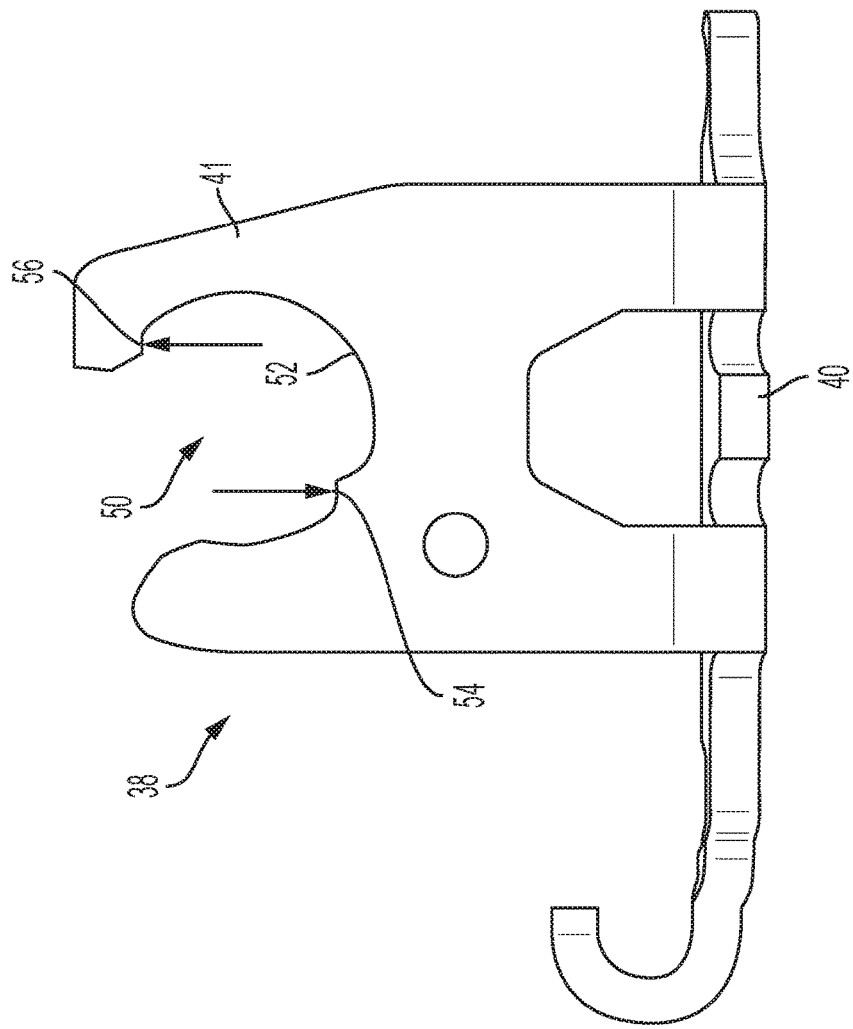
FIG. 2 is an elevational view of a telescope drive bracket having anti-rotation features.

Referring now to FIGS. 2-4, the telescope drive bracket 38 is shown in greater detail. In particular, the telescope drive bracket 38 includes a base portion 40 and a pair of arms 41 extending parallel to each other and away from the base portion 40. The base portion 40 extends longitudinally in a direction substantially parallel to the longitudinal axis X. While it is contemplated that the base portion 40 of the telescope drive bracket 38 may be directly secured to an outer surface of the upper jacket 13, a plate 42 (FIG. 1) is provided in some embodiments, as illustrated. The plate 42 may be welded to the upper jacket 13 in some embodiments, but other securing processes are contemplated. The plate 42 provides additional material thickness to better facilitate mechanical fastening of the telescope drive bracket 38—and/or possible other components—to the upper jacket 13. The base portion 40 of the telescope drive bracket 38 may be fastened to the plate 42 and upper jacket 13 with bolts, rivets or the like.

As shown, the telescope drive bracket 38 is a single, integrally formed component. In some embodiments, the telescope drive bracket 38 is a stamped component. The telescope drive bracket defines a slot 50 defined by each of the arms 41. The slot 50 is dimensioned to receive the nut 34 of the telescope actuator assembly 30 therein. In particular, the slot 50 is defined by a slot surface 52 on each of the arms 41. The slot surface 52 is illustrated as being substantially rounded, but other shapes are contemplated depending upon the shape of the nut 34. Irrespective of the precise shape of the slot surface 52, at least one anti-rotation feature is integrally formed in the stamped telescope drive bracket 38. In the illustrated embodiment, two anti-rotation features are provided in the form of a first anti-rotation feature 54 and a second anti-rotation feature 56. The first and second anti-rotation features 54, 56 are ledges or protrusions that extend inwardly away from the slot surface 52.

The anti-rotation features 54, 56 may be located at positions different from that shown in the Figures. Additionally, the anti-rotation features 54, 56 may be circumferentially spaced from each other in a manner that deviates from that illustrated.

While it is contemplated that only one of the pair of arms 41 includes the anti-rotation features 54, 56, the illustrated embodiment has both arms 41 including the anti-rotation features 54, 56.

Figure 6:
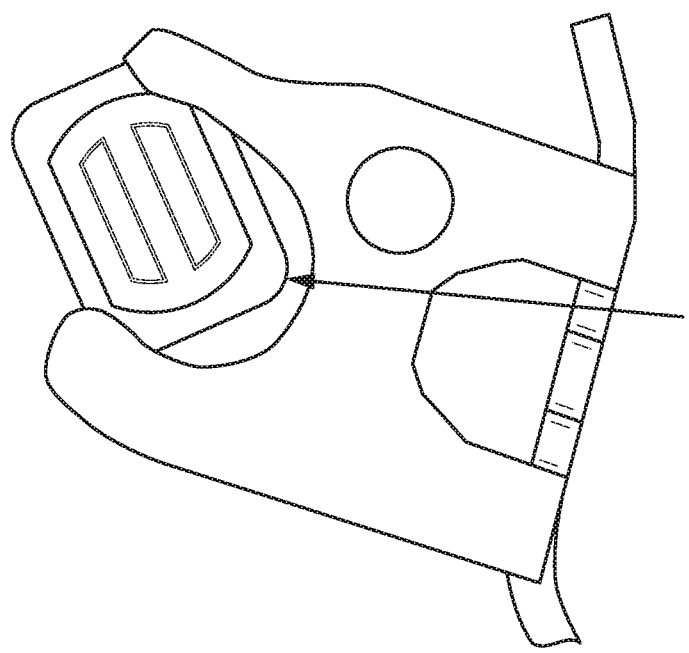
FIG. 6 is an elevational view of the nut rotating out of the telescope drive bracket in an example of a prior art assembly.
Figure 5:
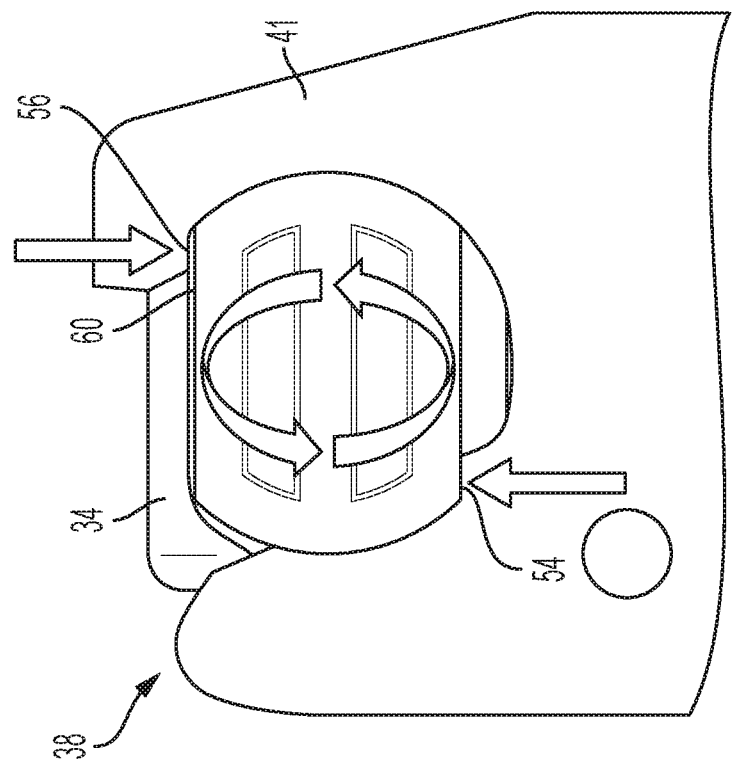
FIG. 5 is an elevational view of a nut disposed within the telescope drive bracket.

Referring now to FIG. 5, the nut 34 is shown in an assembled position within the slot 50 of the telescope drive bracket 38. The nut 34 is positioned in a fixed manner within the slot 50 of the telescope drive bracket 38 to impart telescoping movement of the upper jacket 13, as described above. The nut 34 has an outer surface 60 (for all or a portion of the nut) that is in contact with the anti-rotation features 54, 56. The contact between the nut 34 and the anti-rotation features 54 prevents rotation of the nut 34 during an energy absorption event. As shown in FIG. 6, the telescope drive bracket 38 may rotate, relative to the nut 34, during such an event, and without the anti-rotation features disclosed herein, the telescope actuator assembly 30 may become disengaged from the telescope drive bracket 38. No additional components are needed to maintain the assembled condition.

Figure 7:
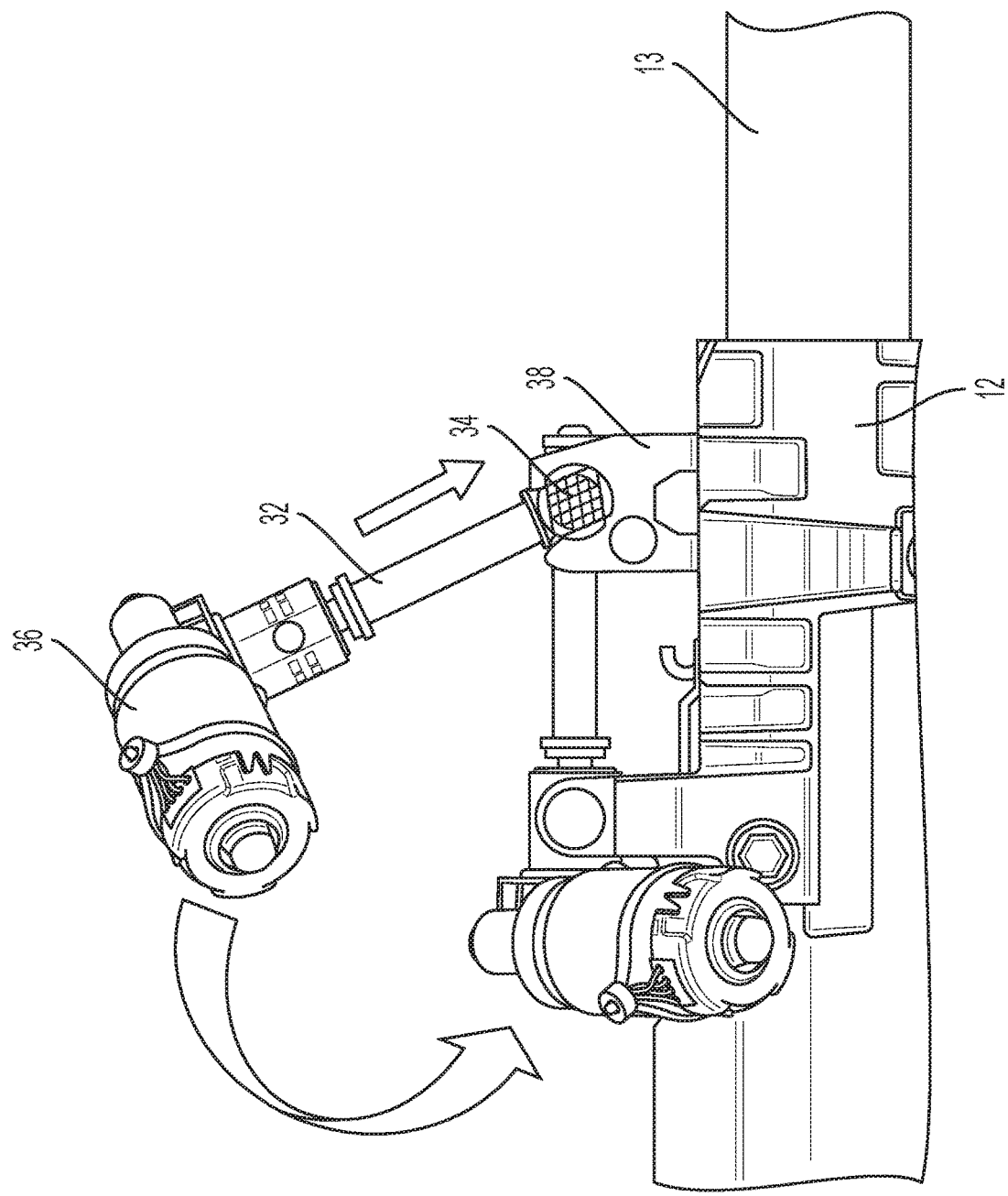
FIG. 7 is an elevational view of a telescope actuator assembly being assembled to the telescope drive bracket.

As shown in FIG. 7, the anti-rotation features 54, 56 provide the above-described anti-rotation capability, while still allowing the telescope actuator assembly 30 to be assembled into the telescope drive bracket 38.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a lower jacket;
   an upper jacket in telescoping engagement with the lower jacket;
   a telescope actuator assembly comprising a nut translatable along a lead screw;
   a telescope drive bracket having a base portion and a pair of arms extending from the base portion, the pair of arms each defining a slot with a respective slot surface, wherein the nut is disposed within the slots in an assembled condition to move the upper jacket in a telescope direction relative to the lower jacket; and
   a first pair of anti-rotation features disposed on the slot surface of a first arm of the pair of arms.

2. The steering column assembly of claim 1, wherein each of the first pair of anti-rotation features comprises a protrusion extending radially inwardly into the slot away from the slot surface.

3. The steering column assembly of claim 2, wherein each of the first pair of anti-rotation features comprises a ledge.

4. The steering column assembly of claim 1, further comprising a second pair of anti-rotation features disposed on the slot surface of a second arm of the pair of arms.

5. The steering column assembly of claim 4, wherein each of the second pair of anti-rotation features comprises a protrusion extending radially inwardly into the slot away from the slot surface.

6. The steering column assembly of claim 5, wherein each of the second pair of anti-rotation features comprises a ledge.

7. The steering column assembly of claim 4, wherein the nut includes an outer surface disposed in contact with the first pair of anti-rotation features and the second pair of anti-rotation features in an assembled condition.

8. The steering column assembly of claim 1, wherein the nut is a jackscrew nut.

9. The steering column assembly of claim 1, wherein the telescope drive bracket is a single, integrally formed component.

10. The steering column assembly of claim 9, wherein the telescope drive bracket is a stamped component.

11. A telescope drive bracket for a steering column assembly comprising:
    a base portion;
    a pair of arms extending from the base portion, the pair of arms each defining a slot with a respective slot surface;
    a first pair of anti-rotation features disposed on the slot surface of a first arm of the pair of arms; and
    a second pair of anti-rotation features disposed on the slot surface of a second arm of the pair of arms, wherein each of the first pair and the second pair of anti-rotation features comprises a protrusion extending radially inwardly into the slot away from the slot surface.

12. The telescope drive bracket of claim 11, wherein the telescope drive bracket is a single, integrally formed component.

13. The telescope drive bracket of claim 12, wherein the telescope drive bracket is a stamped component.

14. The telescope drive bracket of claim 11, wherein each of the first pair and the second pair of anti-rotation features comprises a ledge.

15. A method of assembling a steering column comprising:
- inserting a nut of a telescope actuator assembly into a slot defined by slot surfaces of a pair of arms of a telescope drive bracket at a first angle; and
- rotating the nut within the slot to be disposed in contact with a pair of anti-rotation features formed on each of the slot surfaces to a second angle that is an operating position for the nut, wherein contact with the pair of anti-rotation features constrains rotation of the nut within the slot relative to the telescope drive bracket.

* * * * *